June 5, 1923.

K. O. WINELL 1,457,868

BRAKE MECHANISM

Filed July 7, 1921

Witnesses
Edythe Lambe
Robert Harding Jr.

Inventor
Karl O. Winell

By
Attorney

Patented June 5, 1923.

1,457,868

UNITED STATES PATENT OFFICE.

KARL O. WINELL, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

BRAKE MECHANISM.

Application filed July 7, 1921. Serial No. 483,042.

*To all whom it may concern:*

Be it known that I, KARL O. WINELL, a citizen of the United States, residing in Pittsburgh, in the county of Allegheny and State of Pennsylvania, have invented certain new and useful Improvements in Brake Mechanism, of which the following is a specification.

This invention relates to railway truck brakes and has for an object the provision of means for supporting the brake and for maintaining a brake beam in such a position, when the braking power is released, that the entire faces of the brake shoes will be substantially equidistant from the tread of the wheel, and in such a position when the braking power is applied that the faces of the shoes will be substantially concentric with the tread of the wheel.

Another object of the invention is to provide means whereby a brake lever and rod of a brake rigging is supported from a brake beam.

A further object of the invention is to provide a brake rigging with means for preventing excessive sidewise movement of a brake lever.

These and other objects will be apparent from the following description.

Figure 1:
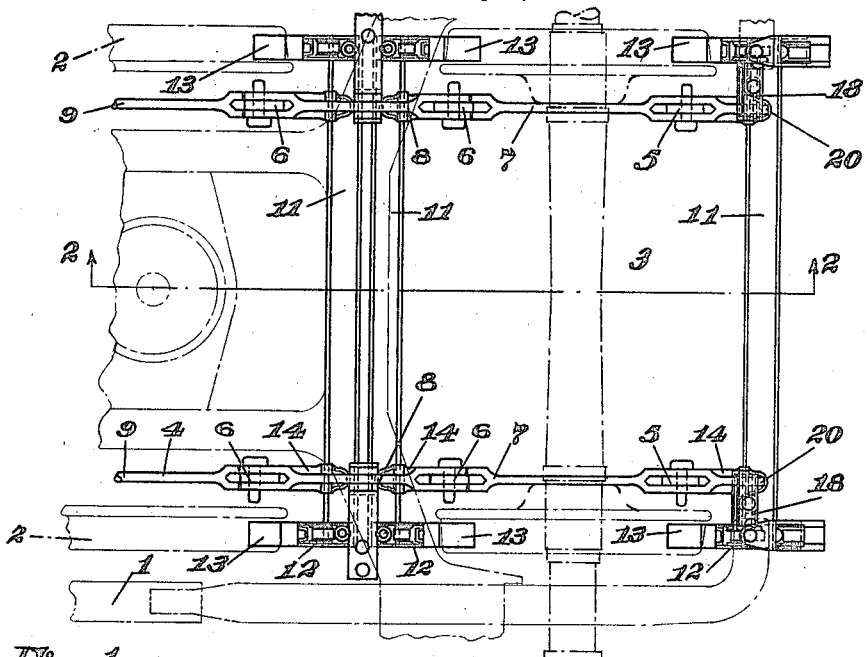
Figure 2:
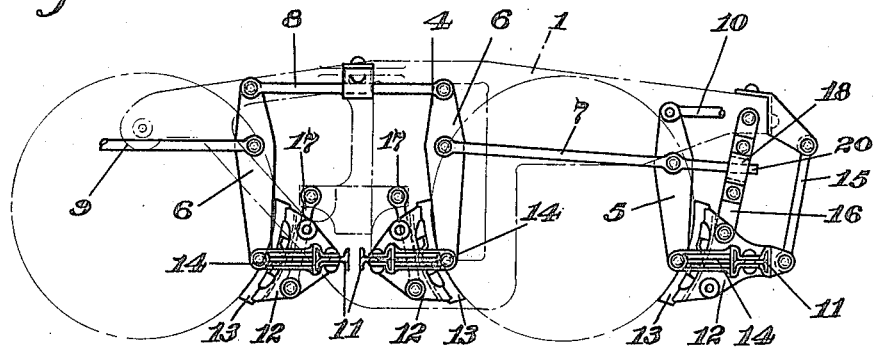
Figure 3:
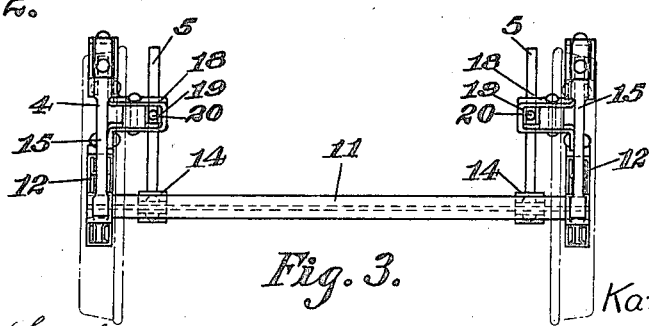

Referring to the drawings, in which like reference characters refer to like parts, Fig. 1 is a plan view of a portion of a brake applied to a railway car truck and embodying the invention, the truck frame and wheels being shown in dot and dash lines, Fig. 2 is a sectional view of the same taken on the line 2—2 of Fig. 1 and Fig. 3 is an end elevational view of the same.

Referring now in detail to the drawings the reference character 1 indicates the truck frame which may be of any suitable form or construction, and 2 the truck wheels that are mounted on axles 3 which are rotatably mounted in suitable axle boxes (not shown) mounted in the truck frame.

The reference character 4 indicates the brake which preferably comprises two sets of connected levers and rods, one set being arranged at each side of the truck. Each of these sets comprises a lever 5 which is arranged adjacent one side of the end wheel of the truck and a lever 6 which is arranged adjacent the opposite side of the same wheel, which levers, intermediate their ends are connected by a longitudinally disposed rod 7. The upper end portion of the lever 6 is connected with the upper end portion of a similar lever 6 arranged adjacent one side of an adjacent wheel by a rod 8. Adjacent the opposite side of this wheel another lever 6 (not shown) is arranged. Intermediate their ends these last mentioned levers 6 are connected through the medium of a rod 9. The upper end of the levers 5 are connected with pull rods 10 which rods may be connected with the usual equalizing mechanism (not shown).

At each side of each pair of wheels a brake beam 11 is provided which extends transversely of the truck and at its ends is provided with brake heads 12 which in turn are provided with shoes 13 adapted to engage the tread of the wheel when the braking power is applied. At their lower ends, each of the brake levers is connected with one of the brake beams 11 preferably through the medium of a member 14 which is secured to the brake beam and pivotally connected with the brake lever.

The brake beam adjacent one side of the end pair of wheels is supported by hangers 15 and 16 while the other brake beams are supported by hangers 17, the upper end portions of all of which are pivotally connected with the side frame and the lower end portions are pivotally connected with the brake heads. The hangers 15 and 16 are spaced apart in a direction longitudinally of the truck, the lower end portions of the hangers 15 being pivotally connected with the brake heads at points preferably beyond the outside longitudinal edge of the brake beam and the lower end portions of the hangers 16 being pivotally connected with the brake heads preferably at point located beyond the opposite longitudinal edge of the brake beam. These hangers 15 and 16 are substantially the same length so that when the braking power is applied or released the brake beam will be held at all times in substantially its desired predetermined position, that is to say, if the beam is initially placed in either a horizontal or vertical position or at an angle the initial position of the beam is substantially maintained as the brake is operated, so that the entire faces of the shoes are substantially concentric with the tread of the wheel when the braking power is applied.

When the braking power is released the hangers 15 and 16, being arranged substantially parallel to each other, will cause the brake shoes to move away from the treads of the wheels in such a manner as to prevent any part of the faces of the shoes from dragging on the wheels, and will maintain the entire faces of the shoes equidistant from the tread of the wheels; this it will be noted is accomplished by the hangers 15 preventing the tilting of the heads, shoes and beam around the points of connection between the hangers 16 and brake heads, and by the hangers 16 preventing the heads, shoes and beam from tilting around the points of connection between the hangers 15 and the brake heads.

Each of the hangers 16 is provided with a member 18 which is provided with an opening 19 through which an extension 20 of the rod 7 is adapted to extend the opening 19 being large enough to permit free relative movement of the rod and hangers. This member is adapted to engage with the rod 7 to prevent undue sidewise movement of the lever 5 and the rod 7.

It will be apparent to those skilled in the art to which this invention appertains that many minor changes may be made in the construction and arrangement of the parts forming the invention without departing from the spirit and scope of the appended claims.

Having thus described the invention what I claim as new and desire to secure by Letters Patent is:—

1. In a brake mechanism, a brake beam, hangers for said beam, brake levers, brake rods connected with said levers, and extensions on said rods adapted to extend through said hangers.

2. In a brake mechanism, a brake beam, hangers for said beam, brake levers, brake rods connected with said levers, and extensions on said rods adapted to engage said hangers to prevent excessive sidewise movement of said levers and rods.

3. In a brake mechanism, a brake beam, hangers for said beam, brake levers, brake rods connected with said levers, extensions on said rods, and means on said hangers adapted to engage with said extensions to prevent excessive sidewise movement of said rod and lever.

4. In a brake mechanism, a brake beam, and a plurality of hangers for supporting each end of the beam, said hangers being connected with opposite sides of the ends of said beam.

5. In a brake mechanism, a brake beam, a plurality of hangers for supporting each end of the beam, said hangers being connected with the opposite sides of the ends of said beam and adapted to maintain said beams in substantially its predetermined position as it is moved when the braking power is applied and when the braking power is released.

6. In a brake mechanism, a brake beam, a brake head and shoe connected with one end of said beam, and a plurality of hangers adjacent each end of the beam and pivotally connected with said head, one of said hangers being connected with said head adjacent one side of the beam, and the other connected with said head adjacent the opposite side of said beam.

7. In a brake mechanism, a brake beam, a plurality of hangers adjacent each end of the beam for supporting the beam, a brake lever connected with said beam, a brake rod connected with said lever, an extension on said rod, and means on one of said hangers adapted to engage with said extension to prevent excessive sidewise movement of said lever and rod.

8. In a brake mechanism, a brake beam, a plurality of hangers adjacent each end of the beam for supporting the beam, a brake lever connected with said beam, and means between said lever and one of said hangers adapted to prevent excessive sidewise movement of said lever.

9. In a brake mechanism, a brake beam, a hanger adjacent each end of the beam for supporting the beam, a brake lever connected with said beam, and means connected with said lever adapted to cooperate with said hanger to prevent excessive sidewise movement of said lever.

In testimony whereof I affix my signature in the presence of two witnesses.

KARL O. WINELL.

Witnesses:
HARRY W. CARBAUGH,
HELEN A. POWER.